United States Patent [19]

Kimmich et al.

[11] Patent Number: 5,473,343
[45] Date of Patent: Dec. 5, 1995

[54] METHOD AND APPARATUS FOR LOCATING A CURSOR ON A COMPUTER SCREEN

[75] Inventors: Jon B. Kimmich, Bellevue; Michael W. Van Flandern, Redmond; Timothy T. Brewer, Bellevue, all of Wash.

[73] Assignee: Microsoft Corporation, Redmond, Wash.

[21] Appl. No.: 264,560

[22] Filed: Jun. 23, 1994

[51] Int. Cl.⁶ .................................................. G09G 5/08
[52] U.S. Cl. .......................................... 345/145; 345/139
[58] Field of Search ..................................... 345/145, 146, 345/139; 348/62, 63

[56] References Cited

U.S. PATENT DOCUMENTS

| | | |
|---|---|---|
| 3,967,266 | 6/1976 | Roy. |
| 4,116,444 | 9/1978 | Mayer et al.. |
| 4,233,631 | 11/1980 | Mahler. |
| 4,454,507 | 6/1984 | Srinivasan et al.. |
| 4,616,262 | 10/1986 | Toriumi et al. ........................ 345/113 |
| 4,759,716 | 7/1988 | Booker et al. ............................ 434/3 |
| 4,812,829 | 3/1989 | Ebina et al. ............................ 345/145 |
| 4,849,908 | 7/1989 | Kurokawa et al.. |
| 4,864,289 | 9/1989 | Nishi et al.. |
| 4,943,296 | 7/1990 | Funakubo et al. ...................... 606/166 |
| 5,270,688 | 12/1993 | Dawson et al. ........................ 345/145 |

FOREIGN PATENT DOCUMENTS

| | | |
|---|---|---|
| 58-211276 | 12/1983 | Japan. |
| 1-200398 | 8/1989 | Japan. |
| 2-90194 | 3/1990 | Japan. |
| 2-144595 | 6/1990 | Japan ........................... 345/145 |

OTHER PUBLICATIONS

"Microsoft Windows 3.1 Step by Step", pp. 4, 5, 156, and 184.

"The Windows Interface: An Application Design Guide", *Microsoft Windows Software Development Kit*, Microsoft Corporation, United States of America, 1992, pp. 37–39.

Judd, I. D. and A. S. Murphy, "Microprocessor–Controlled Cursors", *IBM Technical Disclosure Bulletin*, 22(5):2103–2105, 1979.

*Primary Examiner*—Jeffery Brier
*Attorney, Agent, or Firm*—Seed and Berry

[57] ABSTRACT

A method and computer system detects when a user of a computer depresses and releases a modifier key, for example, the CTRL key. The computer is programmed under a routine to locate the position of an active point of a cursor that is displayed on a computer screen. The computer thereafter generates and sequentially displays on the computer screen, concentric rings of decreasing size that radiate inward, centered on the active point, to thus help a user visually locate the cursor on the computer screen.

30 Claims, 5 Drawing Sheets

METHOD AND APPARATUS FOR LOCATING A CURSOR ON A COMPUTER SCREEN

TECHNICAL FIELD

The present invention relates to locating a cursor or other displayed object on a visual display device such as a computer screen.

BACKGROUND OF THE INVENTION

As is known in the art, a cursor on a computer screen can be used to input commands into a computer. The cursor contains a hot point that indicates the location of the cursor itself. A user can input commands to move the cursor on the screen, thus moving the hot point, by using keyboard arrow keys or a pointing device such as a mouse or trackball.

By moving the cursor and placing the hot point on a particular portion of the screen, commands can be entered into the computer. For example, a computer may have a software program which includes pull-down menus. By placing the hot point of the cursor on a pull-down menu and actuating or "clicking" a switch or button, a menu is displayed on the screen from which a user may enter commands. Similarly, by placing the hot point of the cursor on an icon, file name, menu selection, or other object on the screen and clicking the button, a command can be entered to open or act upon a file or application program that is represented by the icon, file name, menu selection or other object. This method of command selection is commonly known as "point and click," and is commonly performed using computer pointing devices such as mice or trackballs. Overall, the point and dick method of command selection allows users to more easily operate computers.

A user, however, may have difficulty locating the cursor on certain computer screens. For example, high resolution cathode ray tube ("CRT") type screens are able to display a great amount of visual data or detail. The cursor may be difficult to visually locate on high resolution CRT screens because the cursor may be lost among various other objects concurrently displayed, particularly when the cursor is stationary on the screen. Additionally, many portable computers use liquid crystal type displays ("LCD") because LCDs are small, lightweight, and use little power. LCDs, however, have a slow response time between a user's input and a visual feedback to the user on the screen indicating movement of the cursor. Low lighting or insufficient screen contrast on LCDs make it difficult to locate the cursor on these screens. Furthermore, as the size of computer screens grow, a user's ability to rapidly locate the cursor on the screen, without moving the cursor, becomes more difficult.

Prior methods of locating the cursor on the screen generally involve moving the pointing device to thereby move the cursor on the screen and thus allowing the user to visually distinguish the moving object from all of the other objects concurrently displayed on the screen. However, this method of locating the cursor by moving it requires wasted motion and time, especially if the cursor had previously been positioned at a desired location on the screen, in which case, the cursor will subsequently have been moved from that position. Other prior art methods have been developed for more easily locating a moving cursor on an LCD type display, such as Japanese patent publication 2-90194. No method, however, has apparently been developed to help a user more easily visually locate a stationary cursor on a computer screen.

SUMMARY OF THE INVENTION

According to principles of the present invention, the method assists a user in locating a cursor on a visual display device of the computer and includes the steps of (i) waiting for a selected input to the computer by the user, (ii) identifying the cursor on the visual display device after receiving the selected input, and (iii) drawing a first shape on the visual display device about the cursor. The first shape preferably has a center on the visual display device that is approximately located at the same position, or collocated, with the cursor. The method also includes the steps of drawing at least a second shape, smaller than the first shape, the second shape having a center on the visual display device that is also approximately collocated with the cursor, or drawing a series of rings of decreasing size that converge toward the cursor, each ring in the series of rings having a computed radius equal to a radius of the previous ring minus a predetermined amount, and each ring being displayed on the visual display device for a selected time period.

The present invention also embodies an apparatus including a computer having a screen and a user input device and a cursor displayed on the screen. The computer is programmed to detect a selected input from the user input device and display a series of shapes of decreasing size about the cursor upon detection of the selected input. Each shape in the series of shapes is displayed on the screen for a predetermined time period.

DETAILED DESCRIPTION OF THE PRESENTLY PREFERRED EMBODIMENT

Figure 1:
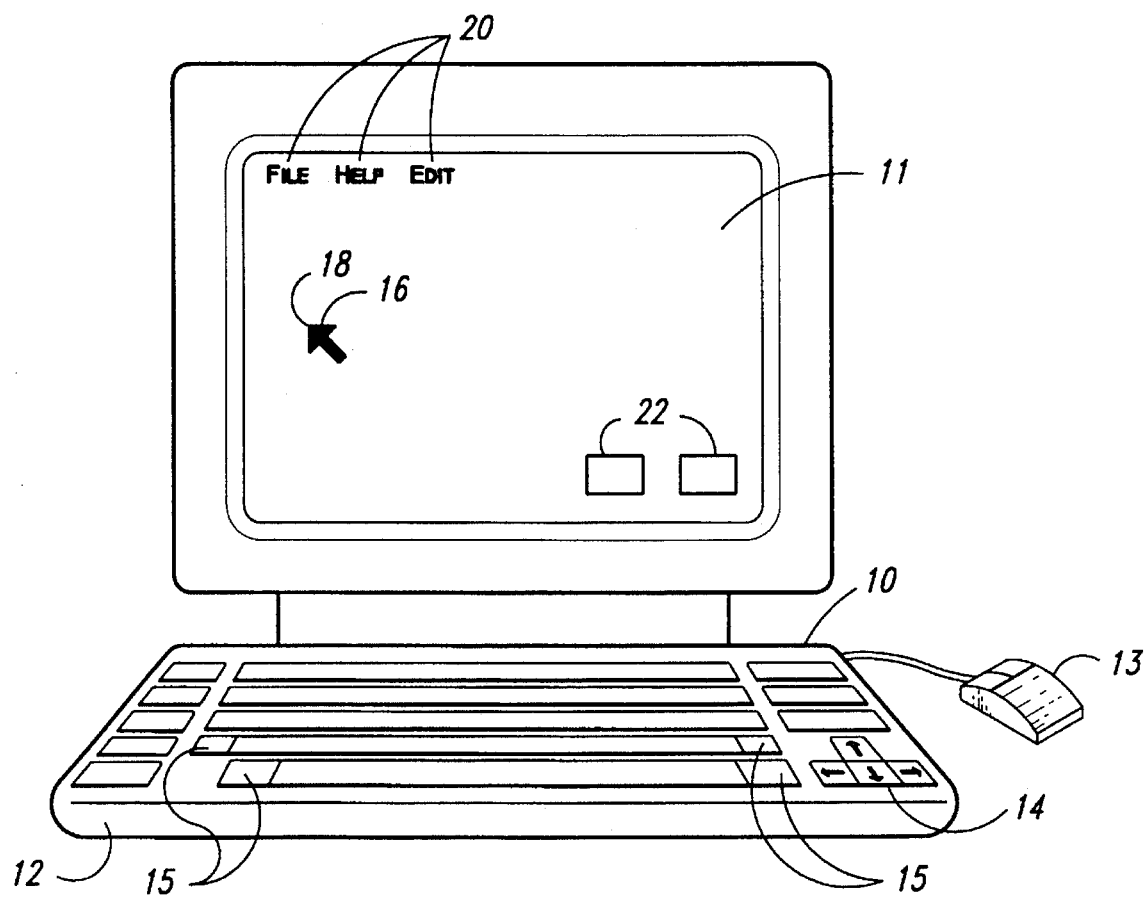
FIG. 1 is an isometric view of a computer showing a cursor displayed on a computer screen in accordance with the present invention.

FIG. 1 illustrates a computer 10 having a visual display device or screen 11, a keyboard 12, and a pointing device 13 such as a mouse or trackball, all of which are coupled to the computer 10. The computer 10 includes a central processing unit ("CPU"), memory and other hardware and software features (not shown) that are associated with most currently available computers. The screen 11 may be a CRT or LCD type screen that provides a visual display output to a user. The keyboard 12 includes cursor movement keys 14 that provide signals to the computer 10 for moving a cursor 16 displayed on the screen 11, and modifier keys 15 such as the control ("CTRL") or alternative ("ALT") keys found on most currently available computer keyboards. Similarly, the pointing device 13 inputs commands to the computer 10, including commands for moving the cursor 16 on the screen 11.

Figure 2:
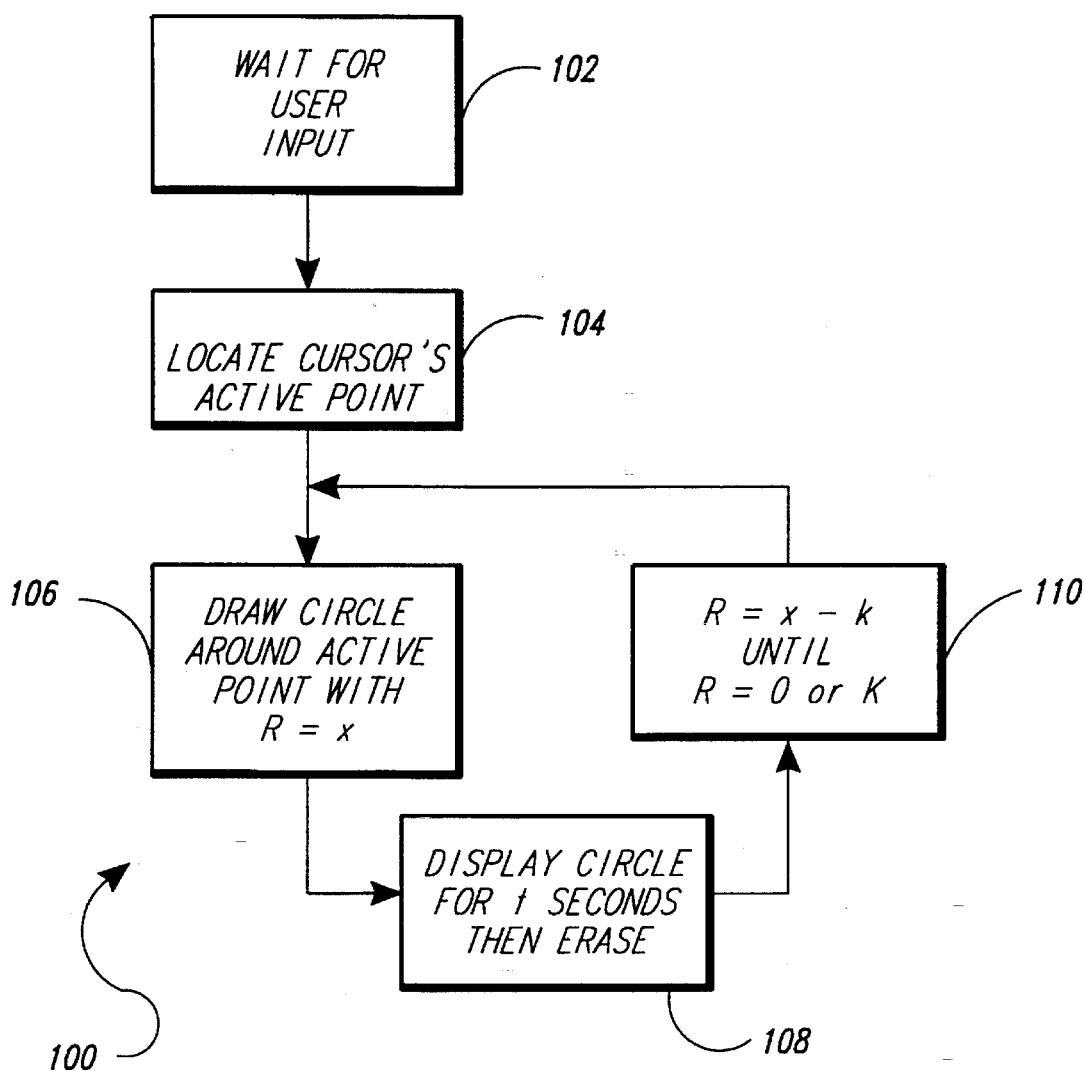
FIG. 2 is a flowchart illustrating the steps carried out according to general principles of the present invention.
Figure 3A:
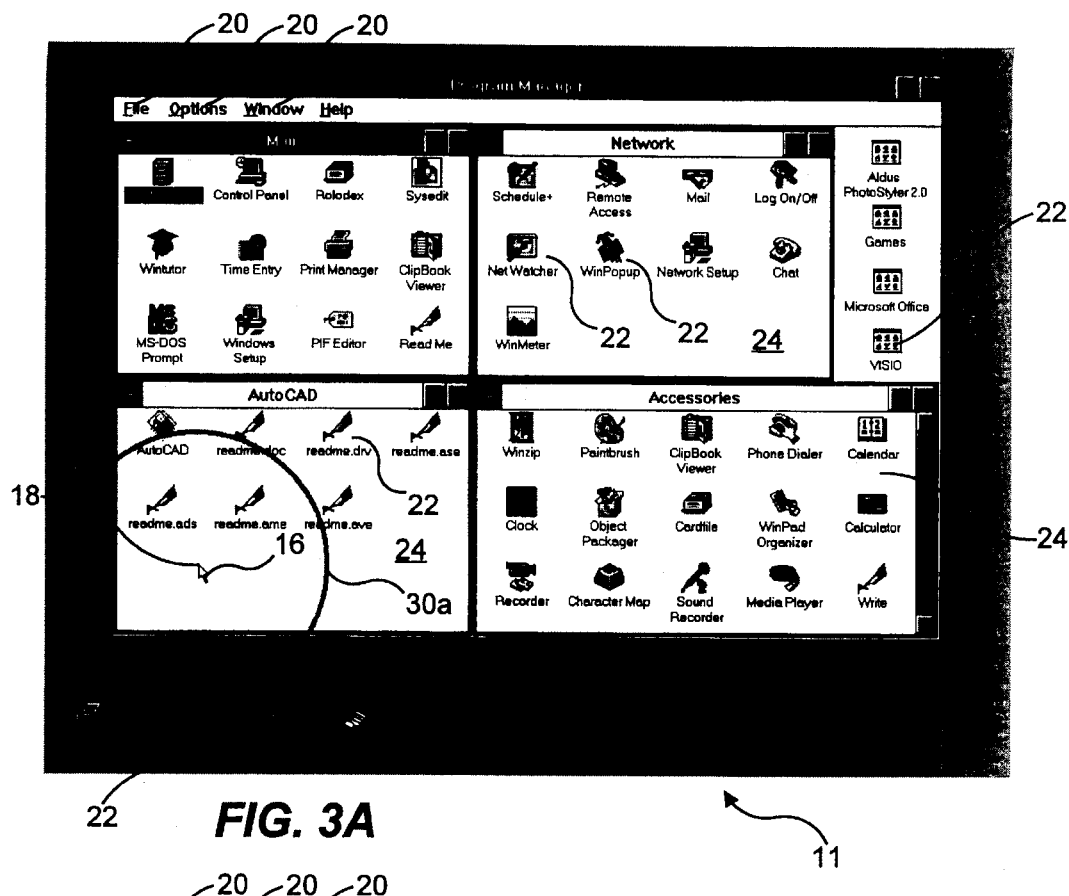
FIG. 3A is a front view of a computer screen showing a first circle drawn at a first time under the present invention.

The cursor 16, shown on the screen 11, has a predetermined visual appearance and includes a hot point 18. While the cursor 16 is shown as an arrow and the hot point 18 as the point of the arrow, various other types of cursors may be used that are particular to a given computer software application. As used generally herein, the term "cursor" refers to any pointer displayed on the screen 11, which is linked with the pointing device 13, for inputting commands into the computer 10. The hot point 18 is the active portion of the cursor 16 for entering commands into the computer 10. By placing the hot point 18 of the cursor 16 on an object or a particular portion of the screen 11, the cursor may be used to input commands into the computer 10. The screen 11 shows pull-down menus 20 and icons 22 upon which a user may place the hot point 18 of the cursor 16 and actuate a button on the pointing device 13 to thereby input a command to the computer directed to these displayed objects. On a screen having numerous pull-down menus, icons and windows 24 (as shown in FIG. 3A, discussed more fully below), the cursor 16 may be difficult to locate. The windows 24 and the other objects shown in the screens 11 are generated by appropriate software routines, such as routines in MICROSOFT® WINDOWS™ operating system, manufactured by Microsoft Corporation FIG. 2 is a flowchart diagram illustrating the main steps carried out under a routine 100 of the present invention for assisting a user in visually locating the cursor 16 on the screen 11. The routine 100, once enabled, begins in step 102 by waiting for an input by the user. The routine 100 waits for one of the modifier keys 15 on the keyboard 12 to be depressed by the user. The computer 10 sets a software flag when the modifier key 15 is depressed. If any other key on the keyboard 12 is depressed concurrently or soon thereafter, the flag is cleared.

After the modifier key 15 is released, the computer 10 checks the status of the flag. If the flag is set, then in step 104, the computer 10 locates the position of the hot point 18 of the cursor 16 on the screen 11. If, for example, the computer 10 employs a bitmap method of displaying images on the screen 11, then each pixel on the screen 11 has specific coordinates. The computer 10, in step 104, therefore locates the particular pixel on the bitmap image of the screen 11 that corresponds to the hot point 18 and the coordinates for that pixel.

In step 106, the computer 10 draws a ring 30*a* or other geometric shape on the screen 11 about the cursor 16 and centered on the hot point 18 as shown in FIG. 3A. The computer 10 preferably draws the ring 30*a* on the screen 11 with the location of the center or origin of the ring approximately equal to the location of the hot point 18 of the cursor 16. Under step 106, the computer 10 computes the equation of the ring 30*a* around the cursor 16 that the ring has an origin equal to the hot point 18 and a radius R equal to a predetermined starting length x (e.g., x=25 mm or the number of pixels equal to about 25 mm for the screen 11). The ring 30*a* drawn by the computer 10 is preferably a few pixels thick (about 2 to 10 pixels). Subroutines for drawing rings, circles or other geometric shapes on a screen 11 are well known to those skilled in the relevant art. The ring 30*a* defines a circle within its interior which is preferably transparent so that the images concurrently being displayed on the screen 11 are visible to the user within the interior of the ring.

In step 108, the computer 10 sets a timer so that the ring 30*a*, previously drawn in step 106, is displayed for a selected period of time t. The selected period of time t is preferably long enough for the user to observe the ring 30*a* on the screen 11, but not so long as to annoy the user (preferably about 0.25 seconds). When the timer expires, the computer 10 erases the ring 30*a* by no longer displaying it on the screen 11.

Figure 3B:
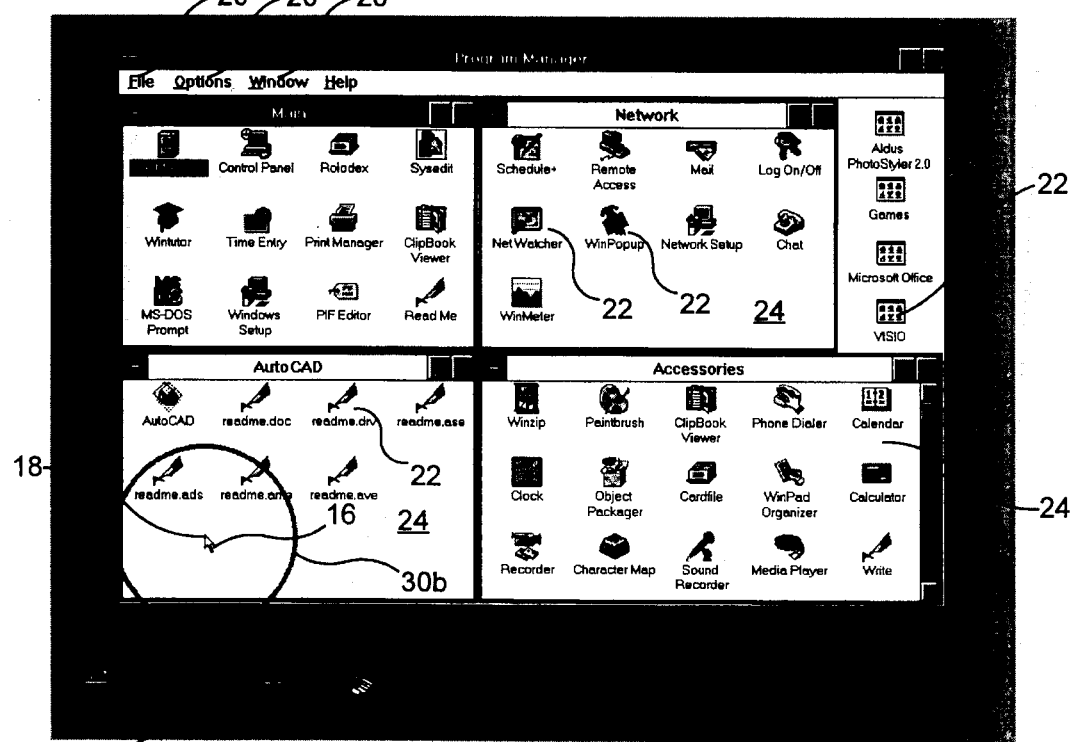
FIG. 3B is a front view of the computer screen of FIG. 3A showing a second circle drawn at a second time.

In step 110, after erasing the previously drawn ring 30*a*, the computer 10 decreases the radius R of the ring by a fixed amount k. For example, if the initial radius R was set at 25 mm, the computer 10 in step 110 subtracts or decreases this radius by about 5 mm (i.e., k≅5 mm or the number of pixels equal to 5 mm for the screen). The computer 10 then draws a new ring 30*b* (shown in FIG. 3B) on the screen 11 around the hot point 18 with the newly computed radius R (i.e., R≅20 mm) in step 106. The routine 100 continues through steps 106, 108 and 110 as the computer 10 draws, displays and erases rings of decreasing size about the cursor 16 until the radius R is equal to zero or some small value K (e.g., K≅5 mm or the number of pixels equal to 5 mm). Thereafter, the flag previously set in step 102 is cleared and the computer 10 exits the routine 100.

Figure 3C:
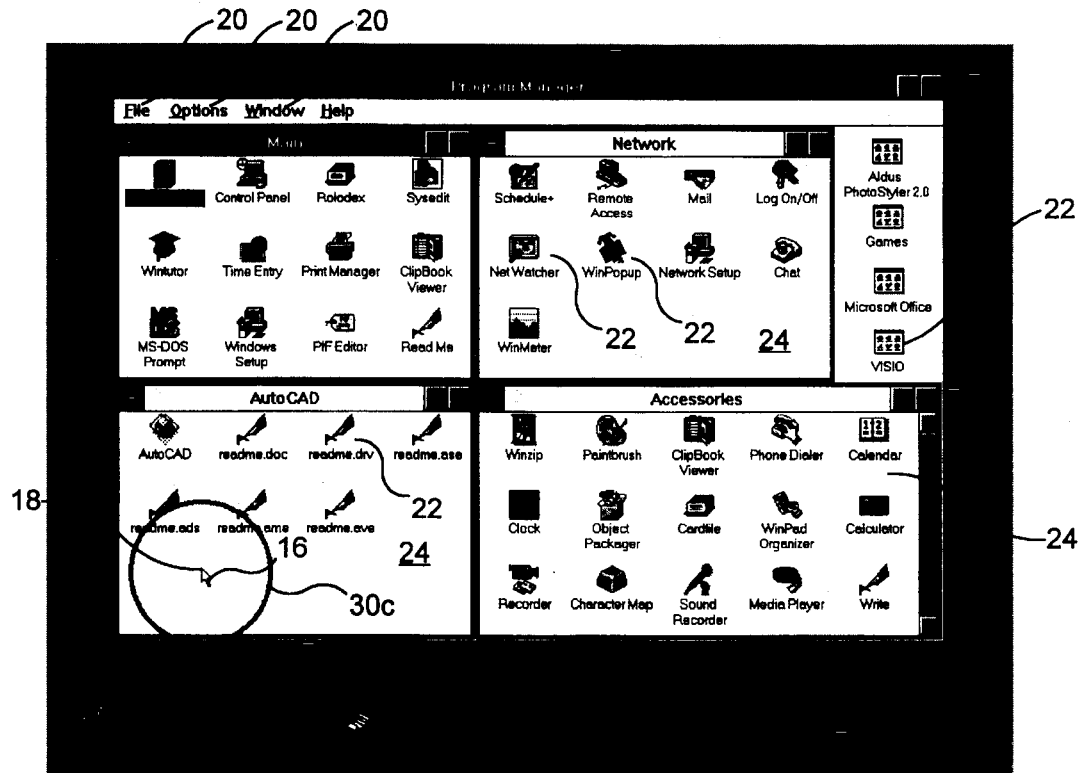
FIG. 3C is a front view of the computer screen of FIG. 3A showing a third circle drawn at a third time.
Figure 3D:
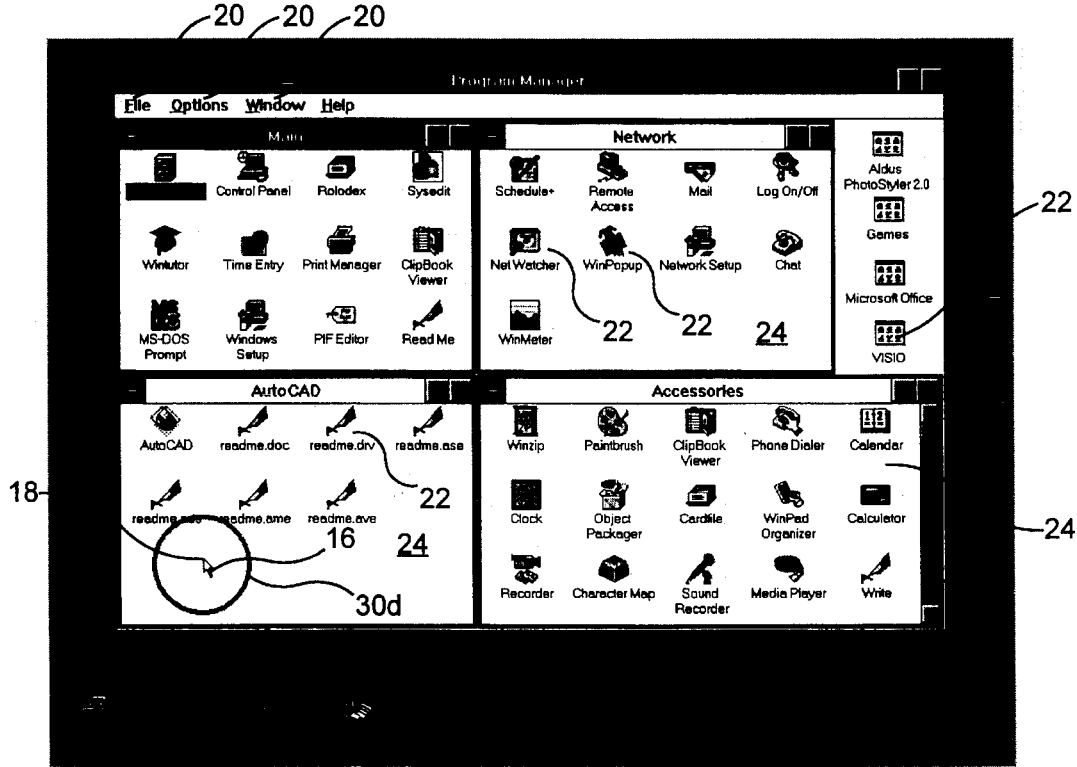
FIG. 3D is a front view of the computer screen of FIG. 3A showing a fourth circle drawn at a fourth time.
Figure 3E:
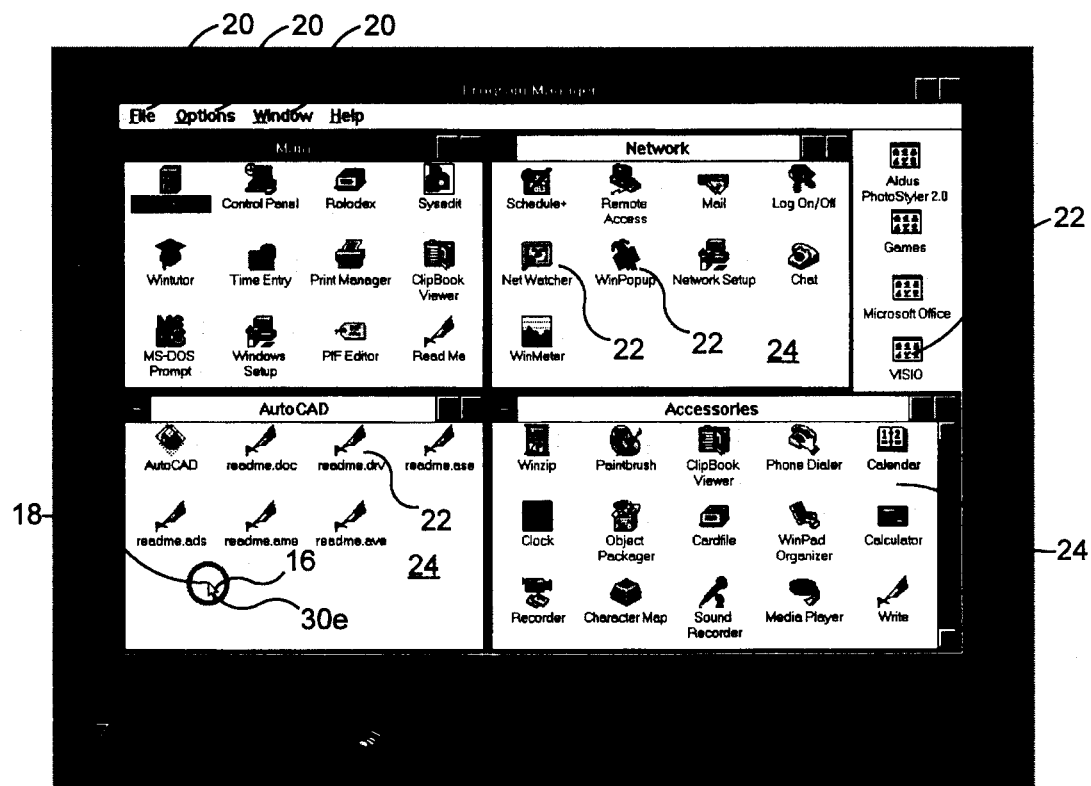
FIG. 3E is a front view of the computer screen of FIG. 3A showing a fifth circle drawn at a fifth time.

As shown in FIGS. 3C, 3D and 3E, the computer 10, under the routine 100, draws, displays and erases the rings 30*c*, 30*d* and 30*e* having radiuses equal to about 15, 10 and 5 mm, all respectively, under the steps 106, 108 and 110. After the computer 10 draws and displays the ring 30*e* (shown in FIG. 3E) in steps 106 and 108, the current radius R is equal to 5 mm. Thereafter, in step 110, the computer 10 decreases the current value R by 5 mm, producing a resulting radius R of zero. Therefore, since R=0, the computer 10 clears the flag previously set in step 102 and exits the routine 100. In this way, the routine 100, upon input by the user in step 102, causes concentric or converging rings of decreasing size to be sequentially displayed and converge on the hot point 18 of the cursor 16.

Various options or additional features may be added to the routine 100. For example, the routine 100 can provide an appropriate signal to the computer 10 whereby the computer provides an audible sound to the user after drawing each ring in step 106, thus indicating to a user that the routine is operating. The routine 100 can draw a single ring or alter the color of each ring in step 110 such that each successive ring drawn in step 106 has a color or shade differing from the previous and any subsequently drawn ring to further assist a user in locating the cursor 16. The routine 100 can provide options which permit the user to adjust the size, frequency, color and/or duration of the shapes drawn by the routine. For example, under the routine 100, the user can select different shapes to be drawn about or proximate to the cursor 16, and select the time each shape is displayed on the screen. The shapes can be any concentric shapes. Alternatively, the routine 100 can draw several shapes such as large arrows distributed proximate to, surrounding but not enclosing, and pointing toward the cursor 16. The routine 100, rather than displaying shapes about the cursor 16, can instead cause the cursor to change its predetermined visual appearance by flashing or changing color upon actuation of the modifier key 15. The routine 100 can also provide an option to allow the user to select a desired type of input for activating the routine, for example, upon actuation of a button on the pointing device 13 rather than the modifier keys 15.

Figure 4:
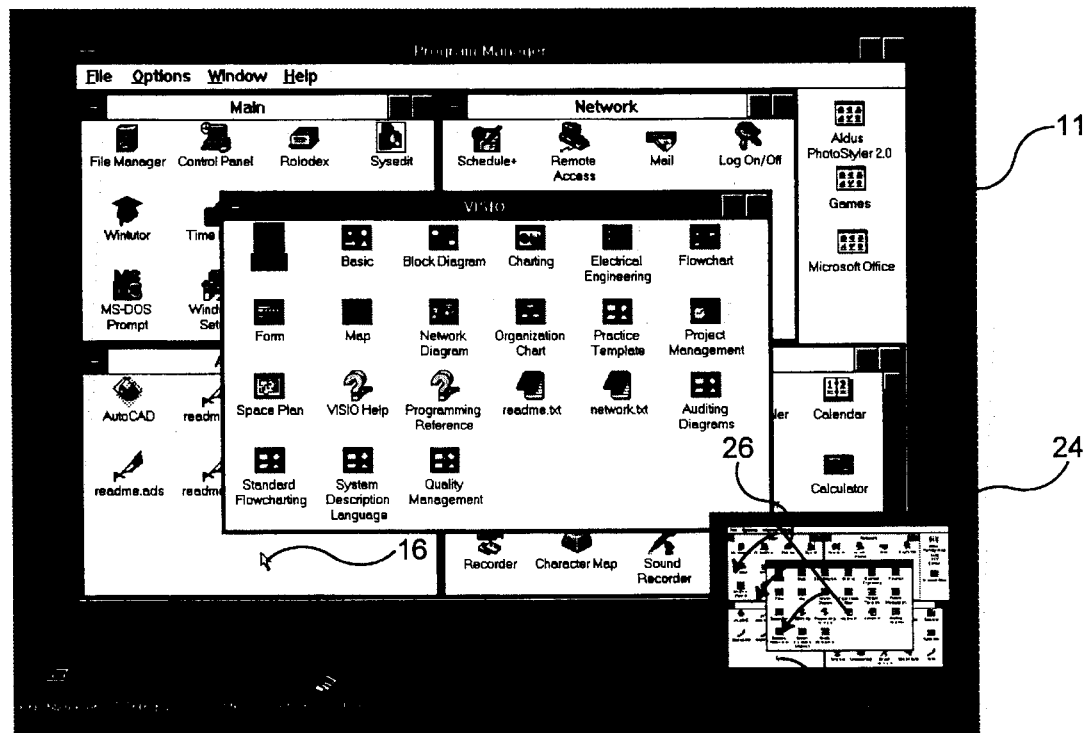
FIG. 4 is a front view of the screen under an alternative embodiment of the present invention.

In an alternative embodiment, the computer 10 under the routine 100 displays a sweeping arm on the screen 11 when the user actuates the modifier key 15. The sweeping arm is fixed at a point of rotation approximately equal to the center of the screen 11 and extends to the edge of the screen as the arm rotates thereabout, in a "radar-like" fashion. As the arm sweeps about the screen 11 and passes over the cursor 16, the computer 10 alters the predetermined appearance of the cursor to become, for example, brighter, darker or of a different color, thus allowing the user to visually locate the position of the cursor on the screen without moving the cursor. Under the alternative embodiment, the computer 10 can instead provide a window 24, as shown in FIG. 4, that provides a reduced size analogy of the screen 11 within which a sweeping arm 26 rotates. The window 24 contains an image of, and the corresponding location for, each object on the screen 11, including an image 16' of the cursor that has a predetermined appearance. As the arm 26 sweeps about the window 24 and passes over the image 16' of the cursor 16, the computer 10 alters the predetermined appearance of the image 16' of the cursor 16 to allow the user to locate the cursor 16 on the screen 11 from the location of the image 16' in the window 24.

As explained above, the routine 100 of the present invention allows a user to depress and release a key on the keyboard 12 to cause concentric tings 30a through 30e of decreasing size to radiate inward, around the cursor, helping the user find the cursor on the screen 11. The routine of the present invention allows a user to visually locate a stationary cursor on high resolution CRT or LCD-type screens, a feature lacking in prior methods. Advantageously, the present invention allows a user to locate the cursor on the screen without having to move the cursor, particularly if the cursor had previously been located at an important location on the screen.

Those skilled in the art will recognize that the above-described invention provides a method of assisting a user in visually locating a cursor on a computer screen. Although specific embodiments of, and examples for, the present invention have been described for purposes of illustration, various equivalent modifications may be made without departing from the spirit and scope of the invention. For example, while the present invention has generally been described above as assisting a user in locating a cursor on a computer screen, the present invention may be used to help a user locate any object displayed on a visual display device. Additionally, while the present invention is generally described above as drawing a series of concentric rings of decreasing size centered on the hot point 18, the present invention may display any series of shapes generally centered on the hot point of the cursor or any other portion of the cursor. Accordingly, the invention is not limited by the disclosure, but instead its scope is to be determined entirely by reference to the following claims.

I claim:

1. A method of assisting a user in locating a stationary, non-blinking cursor on a visual display device of a computer, the method comprising the steps of:

waiting for a selected input to the computer by the user;

identifying an active portion of the stationary, non-blinking cursor on the visual display device after receiving the selected input;

drawing a geometric shape on the visual display device about the stationary, non-blinking cursor while the cursor remains stationary, the geometric shape having a center on the visual display device that is approximately collocated with the identified active portion of the stationary, non-blinking cursor and an average distance to the center equal to a selected value;

displaying the drawn geometric shape for a predetermined time period; and repeating the steps of drawing and displaying to draw at least one additional geometric shape, each subsequently drawn geometric shape after the first drawn geometric shape having a progressively decreasing average distance to its center until the average distance to the center is approximately equal to a first value.

2. The method of claim 1 for use with a computer having a keyboard wherein the step of waiting for a selected input waits for the user to depress and release a selected key on the keyboard.

3. The method of claim 1 wherein the step of drawing a geometric shape draws a ring, and wherein the average distance to the center is a radius of the ring.

4. The method of claim 1, further comprising the steps of setting a flag upon receipt of the selected input;

clearing the flag upon receipt of another input to the computer by the user; and clearing the flag following the steps of drawing, displaying and repeating until the average distance to the center is approximately equal to the first value.

5. The method of claim 1, further comprising the step of providing an audible sound.

6. A method of assisting a user in locating a stationary, non-blinking cursor on a visual display device of a computer, the method comprising the steps of:

displaying the stationary, non-blinking cursor on the visual display device;

waiting for a selected input to the computer by the user;

identifying the stationary, non-blinking cursor on the visual display device after receiving the selected input;

drawing a first shape on the visual display device fully proximate to the stationary, non-blinking cursor; and temporarily displaying the first shape on the visual display device.

7. The method of claim 6 for use with a computer having a keyboard wherein the step of awaiting a selected input waits for the user to depress and release a selected key on the keyboard.

8. The method of claim 6, further comprising the step of producing an audible sound after drawing the first shape.

9. The method of claim 6 wherein the first shape is a geometric shape having a center on the visual display device that is approximately collocated with the cursor, and wherein the method further comprises the step of drawing at least a second geometric shape, smaller than the first geometric shape, the second geometric shape having a center on the visual display device that is approximately collocated with the cursor.

10. The method of claim 9, further comprising the steps of setting a flag upon receipt of the selected input and clearing the flag following the step of drawing at least a second geometric shape.

11. The method of claim 10, further comprising the step of clearing the flag upon receipt of another input to the computer by the user.

12. The method of claim 9 wherein the step of drawing first and second geometric shapes draws first and second rings, respectively.

13. The method of claim 12 wherein the step of drawing the first geometric shape draws the first ring as having a selected radius, and wherein the step of drawing at least a second geometric shape draws the second ring having another radius equal to the selected radius minus a predetermined amount.

14. The method of claim 13, further comprising the step drawing a series of rings of decreasing size that converge toward the cursor, each ring in the series of rings having a computed radius equal to a radius of the previous ring minus the predetermined amount and each ring being displayed on the visual display device for a selected time period.

15. The method of claim 9 wherein the steps of drawing first and second geometric shapes draws rings that are at least two pixels wide.

16. The method of claim 9 wherein the step of drawing the first geometric shape draws the first geometric shape on the visual display device and displays the image of the first geometric shape on the visual display device for a selected time period, and wherein the step of drawing the second geometric shape draws the second geometric shape after the selected time period.

17. The method of claim 16 wherein the first geometric shape has a first color and the second geometric shape has a second color.

18. The method of claim 16, further comprising the step of adjusting the selected time period to another time period prior to the step of waiting.

19. The method of claim 16, further comprising the step of selecting the first and second geometric shapes prior to the step of waiting.

20. A method of increasing the visibility of a stationary, non-blinking object displayed on a visual display device of a system to permit a user to more easily determine the object's location on the display device, the method comprising the steps of:

displaying the stationary, non-blinking object on the display device after the system has been powered up;

sensing an input by the user; and displaying a plurality of graphic elements on the display device, the plurality of graphic elements being approximately centered about the stationary, non-blinking displayed object.

21. The method of claim 20 wherein the step of displaying displays each graphic element on the display device for a predetermined time period.

22. The method of claim 20, further comprising the steps of setting a flag following the step of sensing, and clearing the flag if another input by the user is sensed.

23. The method of claim 20 wherein the step of displaying a plurality of graphic elements displays a series of concentric rings of decreasing size.

24. A method of assisting a user in locating a stationary, non-blinking cursor on a visual display device of a computer, the method comprising the steps of:

continuously displaying the stationary, non-blinking cursor on the visual display device;

waiting for a selected input to the computer by the user;

identifying the stationary, non-blinking cursor on the visual display device after receiving the selected input, the cursor having a preselected visual appearance;

altering the preselected visual appearance of the stationary, non-blinking cursor on the visual display device for a predetermined period of time; and displaying the stationary, non-blinking cursor in its preselected visual appearance after the predetermined time period.

25. The method of claim 24 wherein the step of altering includes the step of causing the cursor to rapidly alternate between the predetermined visual appearance and another visual appearance.

26. The method of claim 24 wherein the step of altering includes the step of changing the color of the cursor.

27. An apparatus comprising:

a computer having a screen, a pointing device having a movable member, and a user input device;

a stationary, non-blinking cursor displayed on the screen; and the computer being programmed to detect a selected input from the user input device and display a plurality of graphic elements of sequentially decreasing size about the stationary, non-blinking cursor upon detection of the selected input and without movement of the movable member of the pointing device, each graphic element in the plurality of graphic elements being sequentially displayed on the screen for a predetermined time period.

28. The apparatus of claim 27 wherein the computer is programmed to set a flag upon receipt of the selected input, and clear the flag following display of the series of shapes.

29. The apparatus of claim 28 wherein the shapes are rings.

30. The apparatus of claim 27 wherein the user input device is a keyboard and the selected input is a depression of a first key on the keyboard, and wherein the computer is programmed to alter the selected input from the first key to a second key.

\* \* \* \* \*

UNITED STATES PATENT AND TRADEMARK OFFICE
CERTIFICATE OF CORRECTION

PATENT NO.    : 5,473,343
DATED         : December 5, 1995
INVENTOR(S)   : Jon B. Kimmich; Michael W. Van Flandern; Timothy T. Brewer It is certified that error appears in the above identified patent and that said Letters Patent is hereby corrected as shown below:

In column 6, claim 4, line 14, following "the steps of" insert --:--.

Signed and Sealed this

Twenty-third Day of April, 1996

Attest:

BRUCE LEHMAN

*Attesting Officer*     *Commissioner of Patents and Trademarks*